United States Patent
Hillman et al.

(12) 
(10) Patent No.: US 6,273,498 B1
(45) Date of Patent: Aug. 14, 2001

(54) INTEGRAL BODY AND FRAME ARRANGEMENT FOR AN AUTOMOBILE

(75) Inventors: Jürgen Hillman, Gifhorn; Klaus-Dieter Morsch, Braunschweig, both of (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 09/511,837

(22) Filed: Feb. 24, 2000

Related U.S. Application Data

(63) Continuation of application No. PCT/EP98/04314, filed on Jul. 10, 1998.

(30) Foreign Application Priority Data

Aug. 29, 1997 (DE) ............................................. 197 37 740

(51) Int. Cl.⁷ .................................................. B62D 21/00
(52) U.S. Cl. ................ 296/203.01; 296/205; 296/203.04
(58) Field of Search ............................... 296/203.01, 205, 296/203.03, 203.04

(56) References Cited

U.S. PATENT DOCUMENTS

| | | | | |
|---|---|---|---|---|
| 1,889,058 | * | 11/1932 | Daste ................... | 296/203.01 |
| 2,071,449 | * | 2/1937 | Accardi ................ | 296/203.01 |
| 2,157,649 | * | 5/1939 | Eksergian ............ | 296/203.01 |
| 2,389,907 | * | 11/1945 | Helmuth .............. | 296/203.01 |
| 3,292,969 | * | 12/1966 | Eggert, Jr. . | |
| 4,045,075 | | 8/1977 | Pulver . | |
| 4,810,028 | * | 3/1989 | Henricks ............. | 296/203.01 X |
| 4,968,087 | | 11/1990 | Goria .................. | 296/197 |
| 4,973,103 | | 11/1990 | Imajyo et al. ....... | 296/195 |
| 5,213,386 | * | 5/1993 | Janotik et al. ...... | 296/203.01 X |
| 5,271,687 | * | 12/1993 | Holka et al. ........ | 296/203.01 X |
| 5,622,382 | | 4/1997 | Zepnik et al. ....... | 280/756 |
| 5,782,525 | * | 7/1998 | Honma et al. ...... | 296/188 |
| 6,003,898 | * | 12/1999 | Teply et al. ........ | 296/203.01 X |
| 6,022,070 | * | 2/2000 | Ashina et al. ...... | 296/205 |
| 6,073,991 | * | 6/2000 | Haert ................. | 296/203.01 X |
| 6,073,993 | * | 6/2000 | Iwatsuki et al. ... | 296/203.04 |

FOREIGN PATENT DOCUMENTS

| | | |
|---|---|---|
| 2336213 | 8/1993 | (DE) . |
| 3008840 | 9/1993 | (DE) . |
| 4445327 | 4/1996 | (DE) . |
| 19503044 | 9/1996 | (DE) . |
| 2076402 | 10/1971 | (FR) . |
| 2718408 | 10/1995 | (FR) . |
| 2308104 | 6/1997 | (GB) . |

\* cited by examiner

*Primary Examiner*—Joseph D. Pape
(74) *Attorney, Agent, or Firm*—Baker Botts LLP

(57) ABSTRACT

An integral body and frame arrangement for an automobile has hollow supporting members which are made out of pressed sheet metal parts and are assembled by at least one joining technique to provide a torsion-proof construction. In one arrangement, at least two U frames are positioned one behind the other in a longitudinal direction of the automobile. The base parts of the U frames are in a floor region of the vehicle body and leg parts of the U frames extend from the floor region to an essentially vertical sidewall vehicle column and/or also extend up to the vehicle roof area. In addition, the U frames are joined directly to each other at least in the region of the free ends of the leg parts or are joined by a flat sidewall part which is mounted on at least one portion of the U frames.

22 Claims, 5 Drawing Sheets

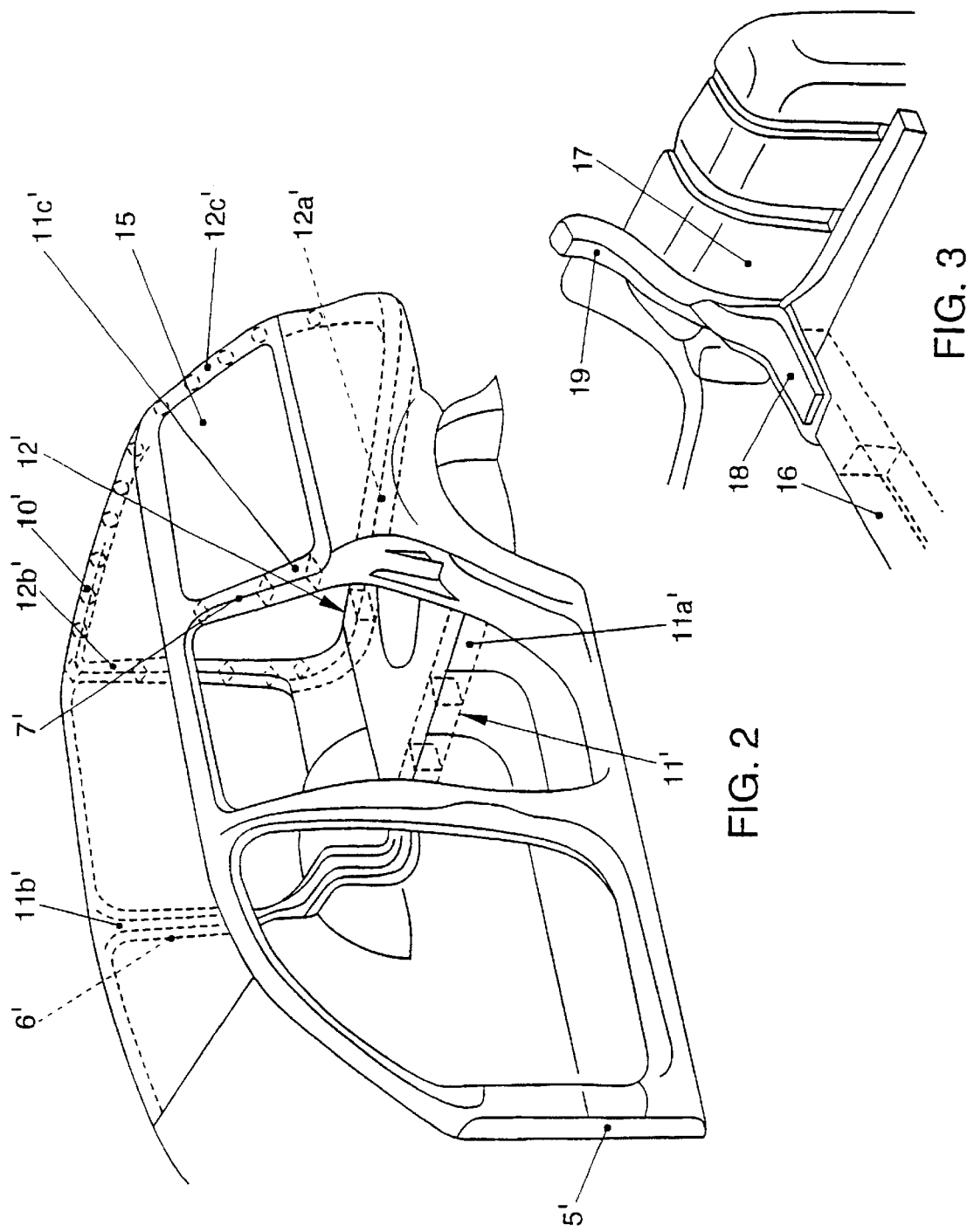

INTEGRAL BODY AND FRAME ARRANGEMENT FOR AN AUTOMOBILE

REFERENCE TO RELATED APPLICATION

This application is a continuation of International Application No. PCT/EP98/04314 filed Jul. 10, 1998.

BACKGROUND OF THE INVENTION

This invention relates to integral body and frame arrangements for automobiles which are made from sheet metal parts.

In a body and frame arrangement disclosed in German Patent No. 44 45 327, a high degree of torsion-proof construction is provided by a special configuration of pressed sheet metal parts at the rear of a vehicle consisting of a hollow frame which is produced by assembling sheet metal sectional parts in the region of a rear shelf.

SUMMARY OF THE INVENTION

It is an object of the present invention to provide an integral body and frame arrangement for an automobile which overcomes disadvantages of the prior art.

Another object of the invention is to provide an integral body and frame arrangement having an improved torsion-proof construction and/or improved characteristic torsion frequencies in motor vehicles.

These and other objects of the invention are attained by providing a body and frame arrangement having two U frames positioned one behind the other in the longitudinal direction of the vehicle, each U frame having a base portion located in a floor region or a roof region of the vehicle body and opposed legs extending from the base of the U to the vertical columns, such as the C and/or D columns of the vehicle, at the roof region or at the floor region of the vehicle. This arrangement permits the major portion of a selected body cross section to be stiffened by a stiffening frame and not, as in the prior art, merely a partial region adjacent the floor area to be stiffened. The arrangement of the invention provides a significant increase in torsion-proof construction with relatively little additional material because the vehicle columns which are integrated in the stiffening frame are already provided as hollow supporting parts. Pressed sheet metal parts designed as attachment parts are added only in transitional regions between the vehicle columns and wheel well shells. Direct transmittal of force from the roof line to the floor region of the vehicle can be produced with such arrangements. A further stiffening effect is also obtained because the U frames, which by themselves provide a significant increase in rigidity, are also joined to each other so that their capacity for torsional motion with respect to each other is restricted. At least two U frames may be joined together either by direct connection of the facing sections or by providing a flat sidewall part that is affixed to the U frames using a joining technique. Such a sidewall part may, for example, be a side plate which is conventionally used in manufacture of the motor vehicle and is fastened to the body by cementing. Thus, the addition of the side plate contributes to restricting torsional motion of the U frames with respect to each other.

A substantial advantage of the invention is that such additional pressed sheet metal parts can be included without any decrease in vehicle convenience, for example loading width, roominess for passengers, etc., with respect to conventional vehicle bodies since all of these structural members may be concealed beneath conventional covering elements so that the body stiffening structures are not noticeable to passengers from the outside and hence represent no visual disturbance of any kind.

Moreover, in addition to or alternatively to improving stiffness, the integral body and frame arrangement of the invention also favorably influences the characteristic torsion frequencies of the body.

Also to be stressed is the fact that, as compared with conventional vehicle bodies, improved stiffness can be achieved without a significant weight increase, particularly when so-called tailored-blank technology and high-pressure formed internal parts are used.

BRIEF DESCRIPTION OF THE DRAWINGS

Further objects and advantages of the invention will be apparent from a reading of the following description in conjunction with the accompanying drawings, in which:

FIG. 2 is a perspective view showing another representative integral body and frame arrangement according to the invention;

FIG. 3 is a fragmentary perspective view showing a portion of the arrangement illustrated in FIG. 2;

DESCRIPTION OF PREFERRED EMBODIMENTS

Figure 1:
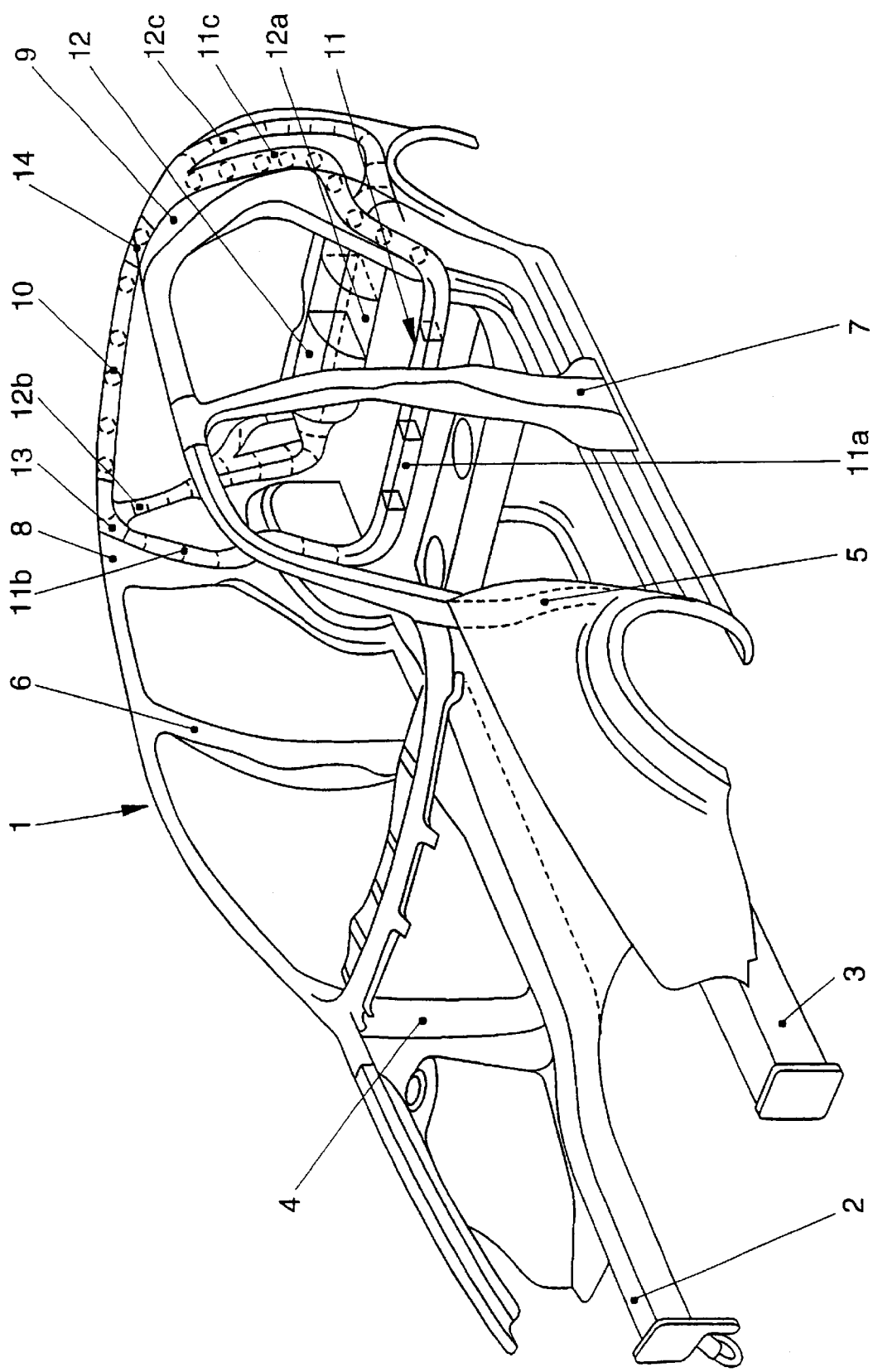
FIG. 1 is a perspective view showing a representative embodiment of an integral body and frame arrangement according to the invention.

In all of the drawing figures like component parts or sections of component parts have the same reference numerals.

In the typical embodiment of the invention shown in FIG. 1, an integral body and frame 1 is made of hollow supporting parts such as, for example, side rails 2 and 3, A columns 4 and 5, B columns 6 and 7, and C columns 8 and 9 or, alternatively, a roof cross member 10, which are pressed sheet metal parts, and optionally also includes parts made by so-called tailored-blank and/or patchwork technology. These hollow supporting parts are specified only by way of example. Additional supporting elements, which for reasons of clarity are not shown and accordingly not named, are of course part of an integral vehicle body and frame. With respect to the integral body and frame 1, the hollow supporting parts form subassemblies which may be assembled from individual pressed sheet metal parts by a wide variety of joining techniques. Possible joining techniques are for example, spot welding, the use of so-called clinch technology, laser welding, cementing and composite connections, i.e., the use of unlike joining techniques in one and the same assembly. The structural arrangements described in detail below make the body 1 especially torsion-proof.

As shown in FIG. 1, at least two U frames 11 and 12 are positioned one behind the other in the longitudinal direction of the vehicle. The base sections 11a and 12a of the frames 11 and 12 are, in this case, both located in a floor region of the vehicle body 1. The projecting legs 11b and 11c and 12b and 12c of the U frames extend from the floor region of the body 1 upwardly into the C columns 8 and 9 and continue up to the vehicle roof, which is not shown in detail. In the example shown in FIG. 1, the corresponding free ends of the facing legs 11b and 11c and 12b and 12c are joined directly to each other. Hence, in a side view of the vehicle frame the joined legs 11b and 12b and 11c and 12c respectively span stable triangles. In this case, the upper ends of the legs 11b and 12b and 11c and 12c respectively are joined in the region of the roof cross member 10, specifically at nodal points 13 and 14, which are shown only schematically. According to an especially advantageous refinement of the invention, the roof cross member 10 is incorporated into the supporting structure produced from the two U frames 11 and 12, so that a completely closed frame section is obtained. Hence the roof cross member 10 also assumes the function of a roll bar and combines with the U frames 11 and 12 to make corresponding O frames.

In the example shown in FIG. 2, the two U frames 11' and 12' are joined by a flat sidewall part. For station wagons this sidewall part advantageously is a window pane 15 which is cemented into the body. Cementing window panes in place has long been known in the prior art and therefore is not described in detail here. Incorporation of the window pane 15 into the U-frame structure greatly reduces the ability of the U frames 11' and 12' to twist with respect to each other so that the vehicle body as a whole becomes highly torsion-proof.

An important aspect of the invention is that the structural sections attached to the U frame are also constructed, at least in sections, of sidewall parts. The sheet metal parts that are normally required for outside and/or inside skin parts are therefore effectively incorporated into the supporting structure. In this connection, the fact that the series arrangement of the U frames can be used in a variety of vehicle types is also important. For compact cars, the arrangement shown in FIG. 1 is appropriate. That is, the U frames are joined to each other in such a way that an arrangement resembling an inverted V in side view is obtained. For station wagons, a U frame arrangement in which the legs of the U frames extend substantially parallel to each other in side view is advantageously provided. For such arrangements, a major contribution to torsion-proof construction is that the sidewall part joining the leg sections to each other extends from the roof area to the belt line of the vehicle. In this case, the course of the lower edge of the window of the vehicle is understood to be essentially the belt line.

U frames that are constructed in the manner of a continuous support are important, particularly in the central region of the vehicle body 1. In the arrangement shown in FIG. 3, such a continuous support is provided by selective installation of attached pressed sheet metal parts. Thus, for example, in a transitional region between a rear vehicle cross member 16, which in this case is an integral component of the U frame 11', and a wheel well shell 17, an angle section 18 is provided as an attached pressed sheet metal part, which advantageously connects directly into the C columns 8 and 9 (see FIG. 1) and B columns 6' and 7' (see FIG. 2) through a curved wheel well section 19. With a suitable arrangement of the parts 18 and 19, the dimensions within the vehicle body which are important to comfort and convenience are in no way adversely affected because there are, as a rule, hollow spaces beneath covering parts in the sections shown in the drawing. Depending upon the type of vehicle, the B columns 6 and 7 or C columns 8 and 9 may themselves additionally be stiffened by welded and/or cemented built-in sections or sheet metal reinforcements in order, for example, to ensure good transmission of force toward the curved wheel well section 19.

Figure 4:
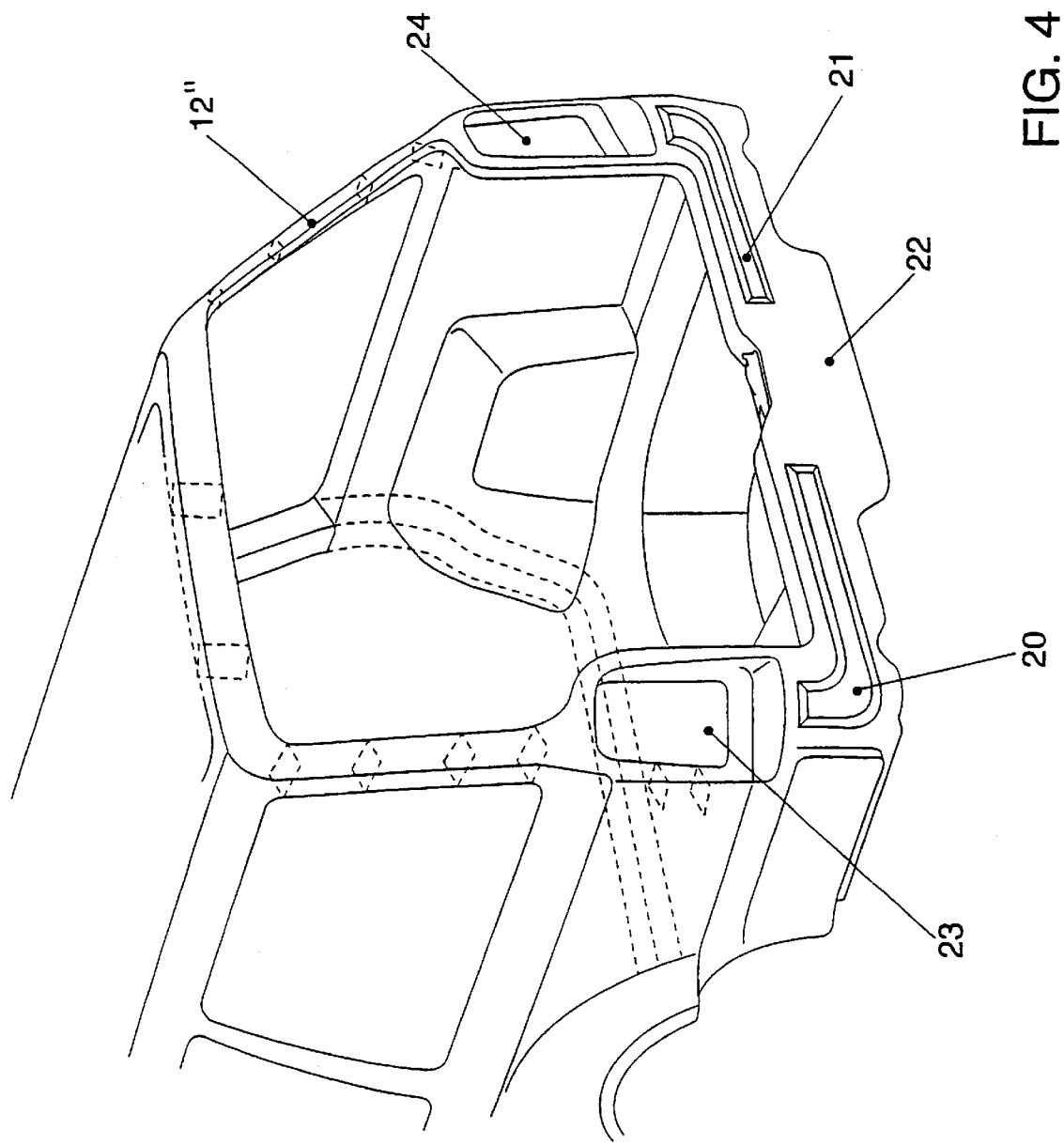
FIG. 4 is a perspective view showing another embodiment of the invention.

Attached pressed sheet metal parts incorporated into the inside of the body may, for example, alternatively constitute a loading ledge metal sheet, as is shown by way of example in FIG. 1 for the floor area 12a. However, exactly the same result can also be obtained by providing two attached pressed sheet metal parts 20 and 21 which are mounted on a rear end plate 22 of the vehicle in the manner shown in FIG. 4. This produces raised portions directed outwardly which can be effectively concealed by bumpers. In an especially advantageous fashion, the attached pressed sheet metal parts 20 and 21 may alternatively be designed for mounting the rear bumper (not shown). The pressed parts 20 and 21 extend into rear lamp areas 23 and 24, which, being small sectional parts, are an integral component of the U frame 12" in this embodiment and consequently do not represent a significant weak point. Particularly in body structures with U sections having a base portion at the roof region, an interruption of the frame structure may in individual cases be acceptable. Accordingly, in this case, there is a gap between the attached pressed sheet metal parts 20 and 21. The weight advantage resulting from providing the gap is considered more important in individual vehicle concepts than the increase in rigidity that might be gained by maintaining continuity between the parts 20 and 21. The reduction in rigidity caused by the gap may, if desired, be compensated for by, for example, providing local material reinforcements such as the use of higher strength materials, thicker sheet metal or the like in the region of the gap.

Figure 5:
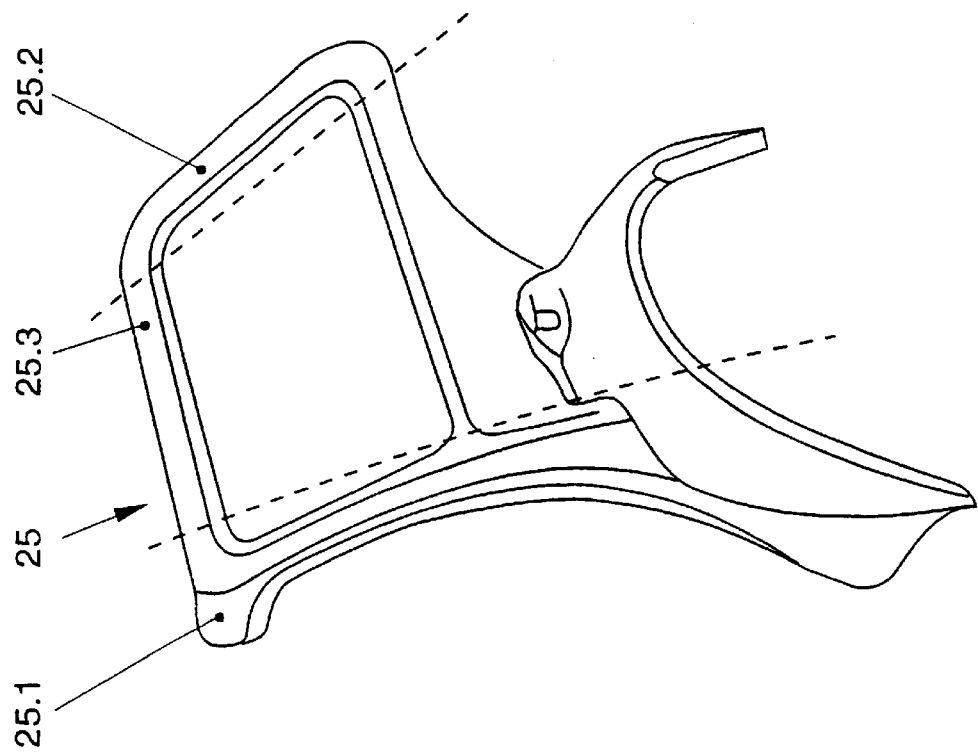
FIG. 5 is a perspective view showing a sidewall inner part prepared for use in the invention.

Also to be emphasized is that, with the use of the attached pressed sheet metal parts, accompanying additional expenditures for material due to the use of sheet metal technology in body areas where rigidity is not so important can be at least partially offset. In this connection, especially good effects are obtained by the use of tailored blank and/or patchwork technology in the area of the sidewall inner parts. FIG. 5 shows a side-wall inner part 25 which is made substantially in the tailored-blank technology of a three-zone sheet. Two zones 25.1 and 25.2 of this part have a sheet thickness for example of 1.2–2.0 mm. By contrast, the thin sheet zone 25.3 lying between the zones 25.1 and 25.2 is only 0.75–1.00 mm thick. In this connection, it is also important that different sheet thicknesses, i.e., thicknesses adapted to the respective rigidity requirements, can be used for the thicker zones 25.1 and 25.2. FIG. 5 also makes clear that no additional weight is required by the incorporation of the inner side wall part 25 as an integral component with the U frames 11 and 12, where large-area sheet metal pressed parts are used.

Figure 6:
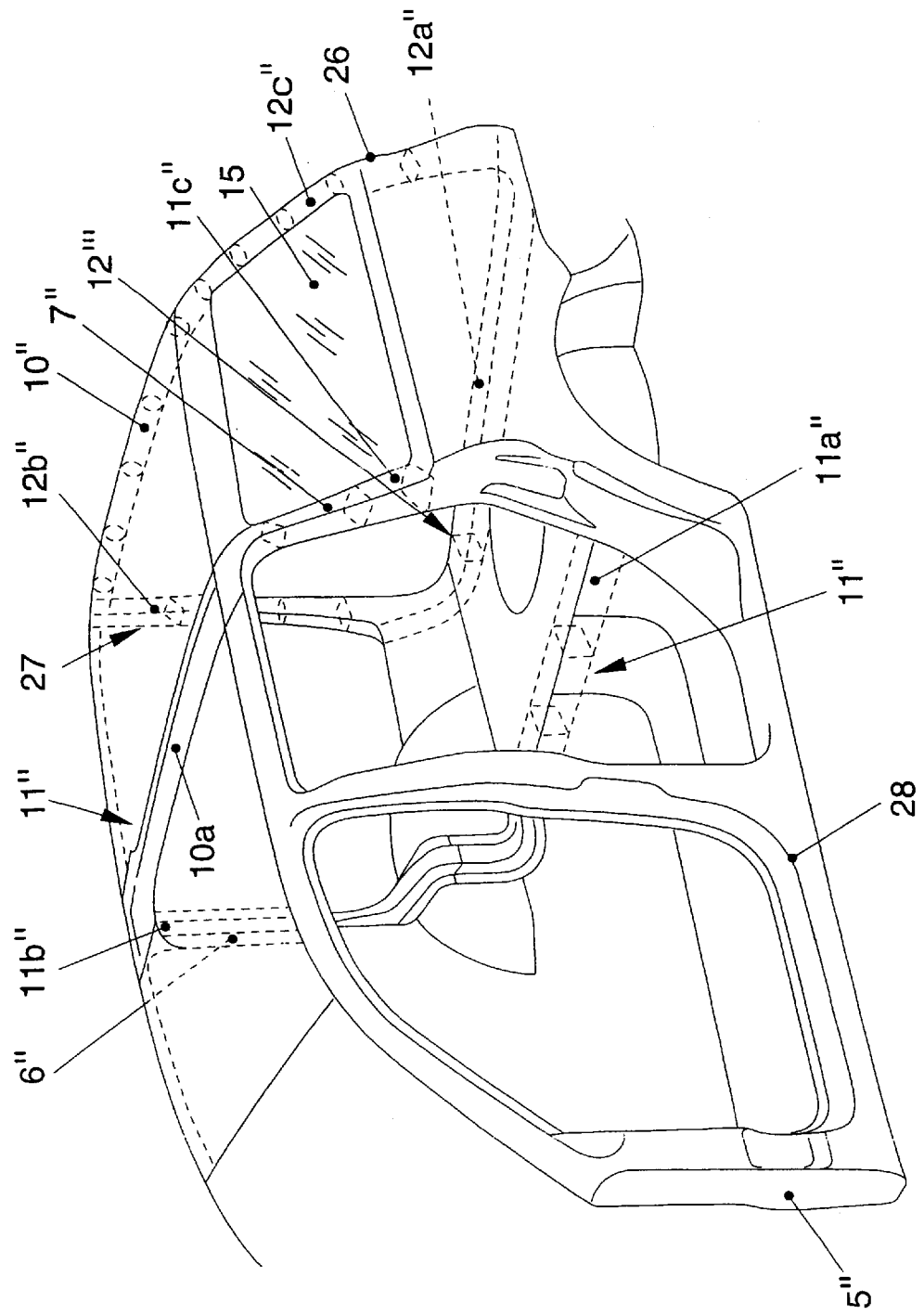
FIG. 6 illustrates a modification of the embodiment shown in FIG. 2.

FIG. 6 shows a roof cross member 10a, preferably in a roof bow design, which, together with the C columns 8 and 9, forms an overhead U frame 11". A comparable configuration may additionally or alternatively be produced with the A columns 4" and 5", the B columns 6" and 7" and with the D columns 26 and 27 which are typical of station wagons. These U frames may also be expanded into O frames by joining them to floor cross members. In this case, joining of the U frames to each other according to the invention may be effected for example by door sills 28.

Another significant advantage of the invention is that construction of the integral body and frame arrangement need not be entirely of steel. Individual sections of the U frame may alternatively be made by light-weight building materials such as aluminum or magnesium alloys. The use of nodal elements, which are produced by casting techniques or by internal high-pressure molding, is likewise possible.

Although the invention has been described herein with reference to specific embodiments, many modifications and variations therein will readily occur to those skilled in the art. Accordingly, all such variations and modifications are included within the intended scope of the invention.

We claim:

1. An integral body and frame arrangement for a vehicle comprising a plurality of hollow pressed sheet metal supporting parts assembled into an integrated unit by at least one joining technique including:

at least two U frames positioned one behind the other in the longitudinal direction of the vehicle with base parts of the U frames located in a floor region or a roof region of the vehicle body and opposed leg parts of the U frames extending from the base parts into engagement with substantially vertical sidewall columns of the vehicle adjacent to the vehicle roof region or floor region; and the leg parts of the U frames being joined to each other either directly or through a flat sidewall part attached to the U frames, wherein one U frame forms a continuous support comprising a rear vehicle cross member and an angle section which is a pressed sheet metal part connected directly into a vehicle sidewall column to join the rear vehicle cross member to the vertical sidewall column.

2. An integral body and frame arrangement according to claim 1 wherein the leg parts of the U frames are joined to each other in such a way that the joined leg parts are in the shape of an inverted V when viewed from the side of the vehicle.

3. An integral body and frame arrangement according to claim 1 wherein at least portions of the leg parts of the U frames are integrated in to at least one side wall of a vertical column of the vehicle.

4. An integral body and frame arrangement according to claim 1 wherein the leg parts of the U frames extend substantially parallel to each other as viewed from the side of the vehicle.

5. An integral body and frame arrangement according to claim 4 wherein the flat sidewall part extends from a belt line of the vehicle up to the vehicle roof region.

6. An integral body and frame arrangement according to claim 4 wherein the sidewall part is a window pane.

7. An integral body and frame arrangement according to claim 6 wherein the window pane is cemented to at least portions of the vehicle body.

8. An integral body and frame arrangement according to claim 1 wherein at least one of the U frames has an interruption in the region of the vehicle floor which is shorter than half the length of the base part.

9. An integral body and frame arrangement according to claim 1 wherein the pressed sheet metal part, starting from the vehicle cross member extends along a wheel well shell into one of the vehicle sidewall columns.

10. An integral body and frame arrangement according to claim 1 wherein the base part and/or the leg parts sections of a U frame are at least partially formed by attached pressed sheet metal parts that, together with body wall parts, constitute hollow supports.

11. An integral body and frame arrangement according to claim 10 wherein the attached pressed sheet metal parts, together with a rear end plate, constitute hollow supports.

12. An integral body and frame arrangement according to claim 11 wherein at least one of the attached pressed sheet metal parts is located in the inside of the vehicle body.

13. An integral body and frame arrangement according to claim 12 wherein an attached pressed sheet metal part constitutes a loading ledge inside the vehicle body.

14. An integral body and frame arrangement according to claim 11 wherein at least one of the attached pressed sheet metal parts is attached to the outside of the rear end plate.

15. An integral body and frame arrangement according to claim 14 wherein the location of the attached pressed sheet metal parts is selected so that they are capable of being covered by a bumper-arrangement.

16. An integral body and frame arrangement according to claim 15 wherein the attached pressed sheet metal parts constitute a mount for a bumper-arrangement.

17. An integral body and frame arrangement according to claim 1 wherein at least portions of two leg parts of the U frames are integral components of a sidewall inner part.

18. An integral body and frame arrangement according to claim 17 wherein the sidewall inner part is formed by tailored-blank technology and sheet metal sections of the sidewall inner part which are attached to the U frames have greater thickness and/or have greater strength than a central portion of the sidewall inner part between the sheet metal sections.

19. An integral body and frame arrangement according to claim 1 wherein at least one of the U frames is closed by a member in the roof region of the vehicle to form an O frame.

20. An integral body and frame arrangement according to claim 19 wherein a roof cross has member ends fastened to the ends of the leg parts of a U frame to form an O frame.

21. An integral body and frame arrangement according to claim 20 wherein the base part of at least one of the U frames is formed by a roof cross member.

22. An integral body and frame arrangement according to claim 1 wherein the sidewall part is formed by a sill.

* * * * *